(12) United States Patent
Thompson

(10) Patent No.: US 7,246,947 B2
(45) Date of Patent: Jul. 24, 2007

(54) CONCENTRIC RADII BALL BEARING STACK

(75) Inventor: Stephen Thompson, Edmonton (CA)

(73) Assignee: QA Bearing Technologies Ltd., Edmonton, Alberta (CA)

( * ) Notice: Subject to any disclaimer, the term of this patent is extended or adjusted under 35 U.S.C. 154(b) by 130 days.

(21) Appl. No.: 11/176,052

(22) Filed: Jul. 7, 2005

(65) Prior Publication Data
US 2006/0233477 A1   Oct. 19, 2006

(30) Foreign Application Priority Data
Apr. 18, 2005   (CA) .................................... 2504233

(51) Int. Cl.
*F16C 17/10* (2006.01)
(52) U.S. Cl. .................................................... 384/516
(58) Field of Classification Search ................ 384/516, 384/513, 512, 569
See application file for complete search history.

(56) References Cited

U.S. PATENT DOCUMENTS

| | | | |
|---|---|---|---|
| 5,051,004 A | * | 9/1991 | Takeuchi et al. ............ 384/516 |
| 2004/0076355 A1 | * | 4/2004 | Ishiguro et al. ............. 384/516 |

* cited by examiner

*Primary Examiner*—Lenard A. Footland
(74) *Attorney, Agent, or Firm*—Davis Bujold & Daniels, P.L.L.C.

(57) ABSTRACT

A ball bearing stack which includes more than one bearing arranged in face to face relation and sharing a common rotational axis. Each bearing has an inner ring and a concentric outer ring. The inner ring defines an inner race. The outer ring defines an outer race. A plurality of ball bearings are captured within an annular space defined between the inner race and the outer race. Each of the more than one bearing has a ball bearing contact surface on the outer race which is radiused from face to face about a common centre point positioned on the common rotational axis.

5 Claims, 23 Drawing Sheets

CONCENTRIC RADII BALL BEARING STACK

This application claims priority from Canadian Application Serial No. 2,504,233 filed Apr. 18, 2005.

FIELD OF THE INVENTION

The present invention relates to a ball bearing stack.

BACKGROUND OF THE INVENTION

In drive shaft applications, an outer race of a bearing engages a housing and an inner race of the bearing engages a drive shaft. Many of the popular rotary steering tools used for directional drilling, initiate directional changes by creating a bend in the drive shaft while drilling. The resulting angular displacement between the shaft and the housing axis, corner loads the traditional radial support bearings leading to premature seal deterioration and catastrophic bearing failure.

SUMMARY OF THE INVENTION

According to the present invention there is provided a ball bearing stack which includes more than one bearing arranged in face to face relation and sharing a common rotational axis. Each bearing has an inner ring and a concentric outer ring. The inner ring defines an inner race. The outer ring defines an outer race. A plurality of ball bearings are captured within an annular space defined between the inner race and the outer race. Each of the more than one bearing has a ball bearing contact surface on the outer race which is radiused from face to face about a common centre point positioned on the common rotational axis.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Concentric radii ball bearing stacks will now be described with reference to FIG. 1 through 23.

Figure 1:
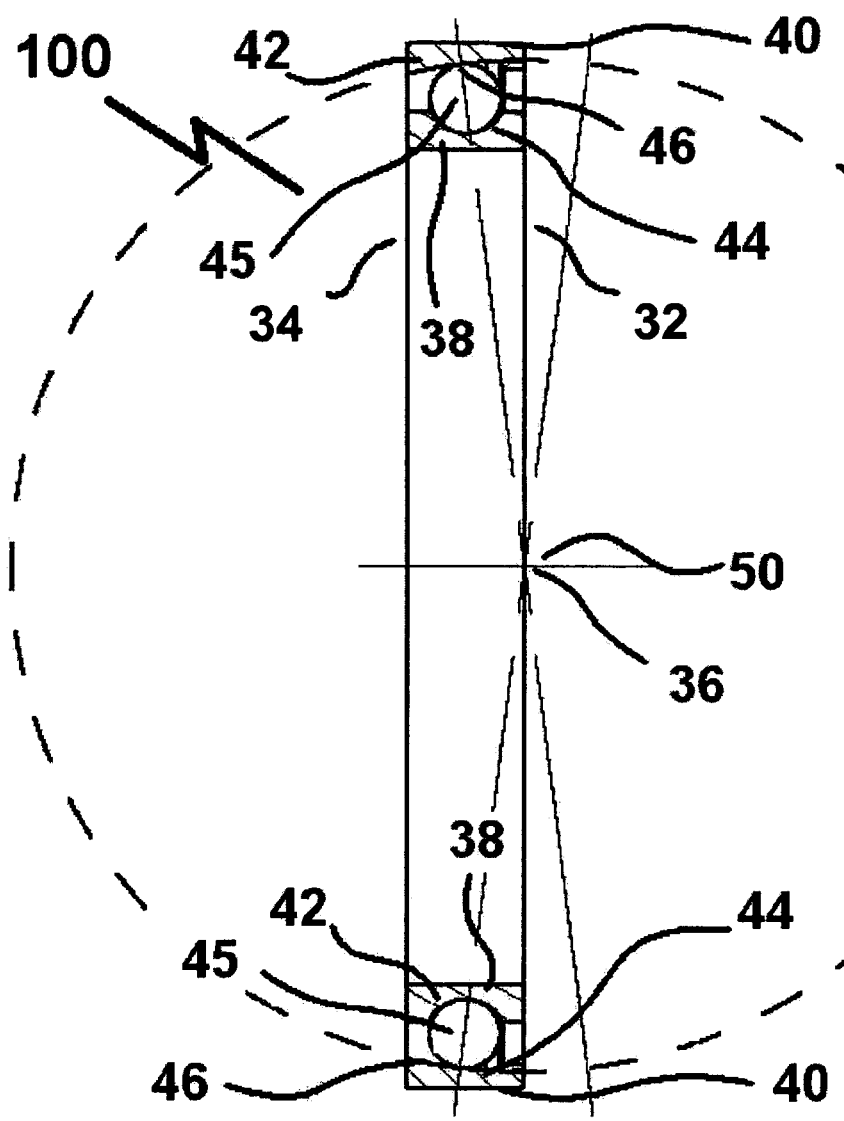
FIG. 1 is a side elevation view, in section, of a first individual bearing constructed in accordance with the teachings of the present invention, with rotational axis and radial centre point marked.
Figure 2:
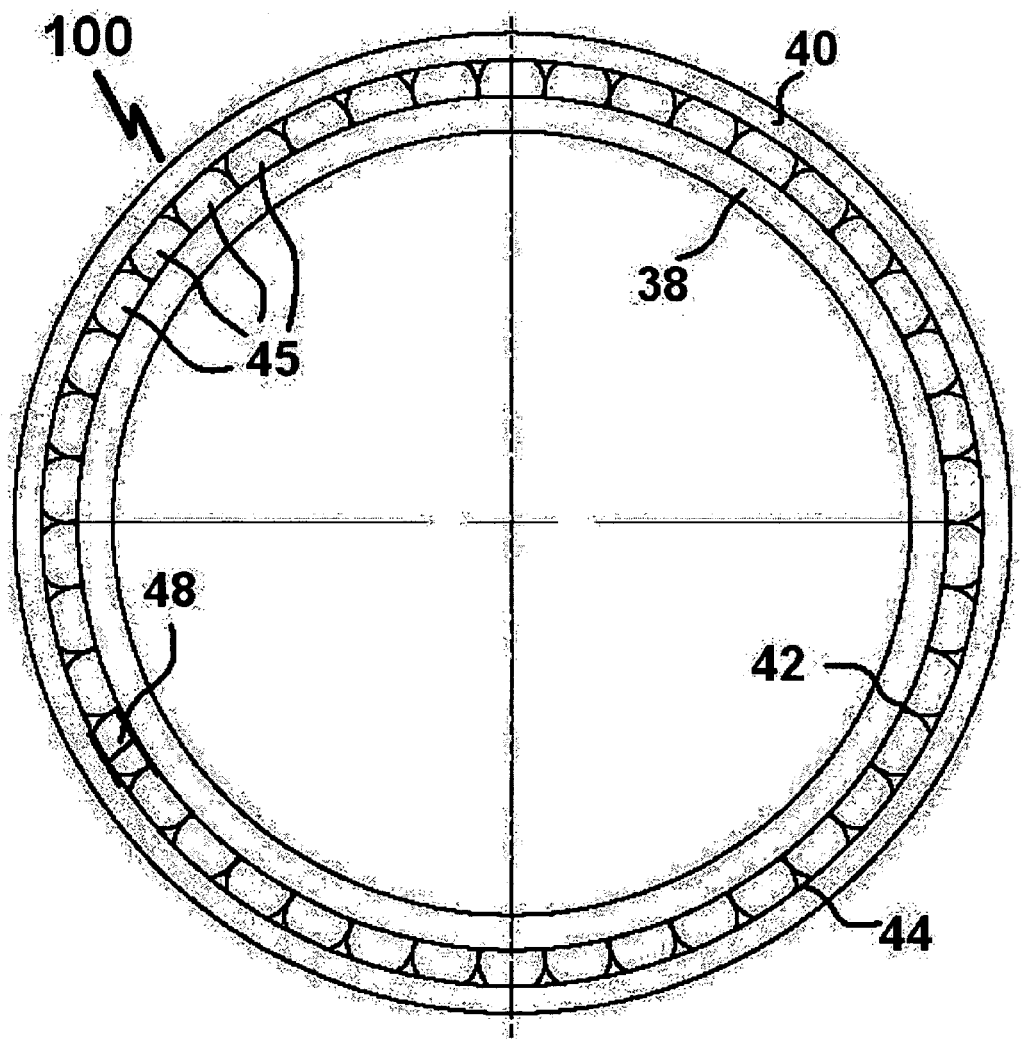
FIG. 2 is a top plan view, in section, of the first individual bearing illustrated in FIG. 1.
Figure 3:
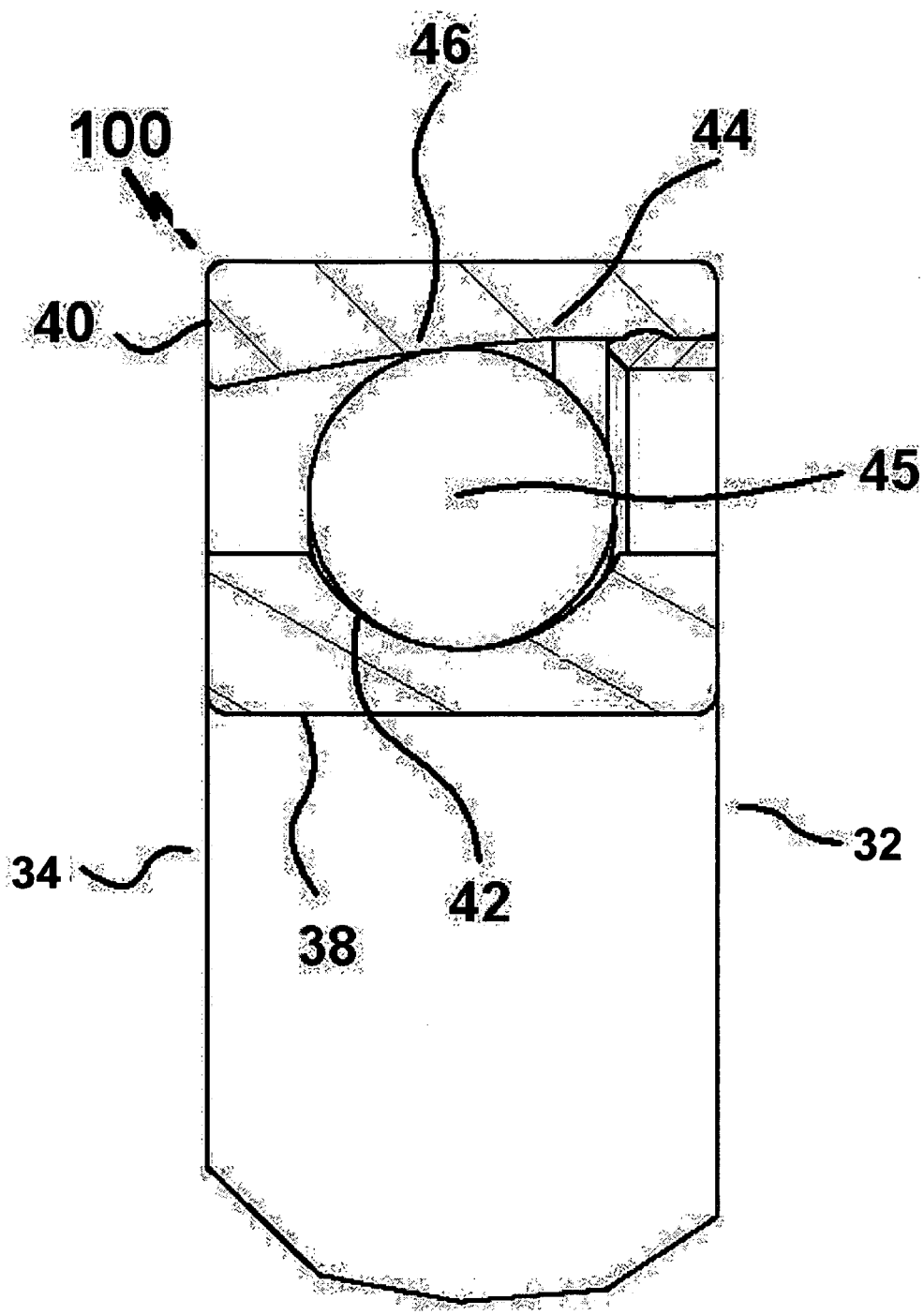
FIG. 3 is a detailed side elevation view of the radiused contact surface of the first individual bearing illustrated in FIG. 1.

Referring to FIG. 1, there is illustrated a first individual bearing, generally identified by reference numeral 100. First individual bearing 100 has a first face 32, a second face 34 and a rotational axis 36. Referring to FIG. 2, first individual bearing 100 has an inner ring 38 and a concentric outer ring 40. Inner ring 38 defines an inner race 42. Outer ring 40 defines an outer race 44. A plurality of ball bearings 45 are captured within an annular space 48 defined between inner race 42 and outer race 44. Referring to FIG. 3, first individual bearing 100 has a radiused ball bearing contact surface 46 on outer race 44. Referring to FIG. 1, ball bearing contact surface 46 is radiused from face 32 to face 34 about a centre point 50 positioned on rotational axis 36.

Figure 4:
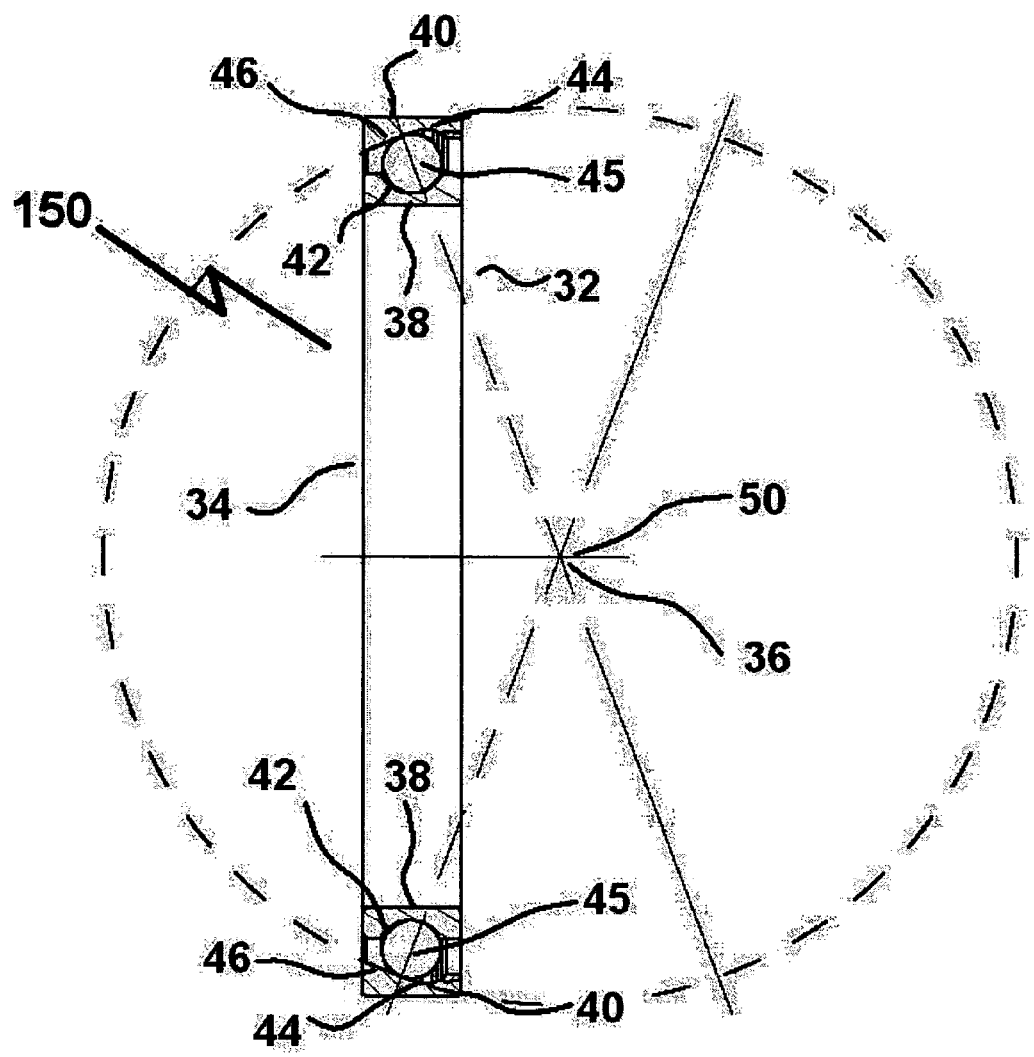
FIG. 4 is a side elevation view, in section, of a second individual bearing constructed in accordance with the teachings of the present invention, with rotational axis and radial centre point marked.
Figure 5:
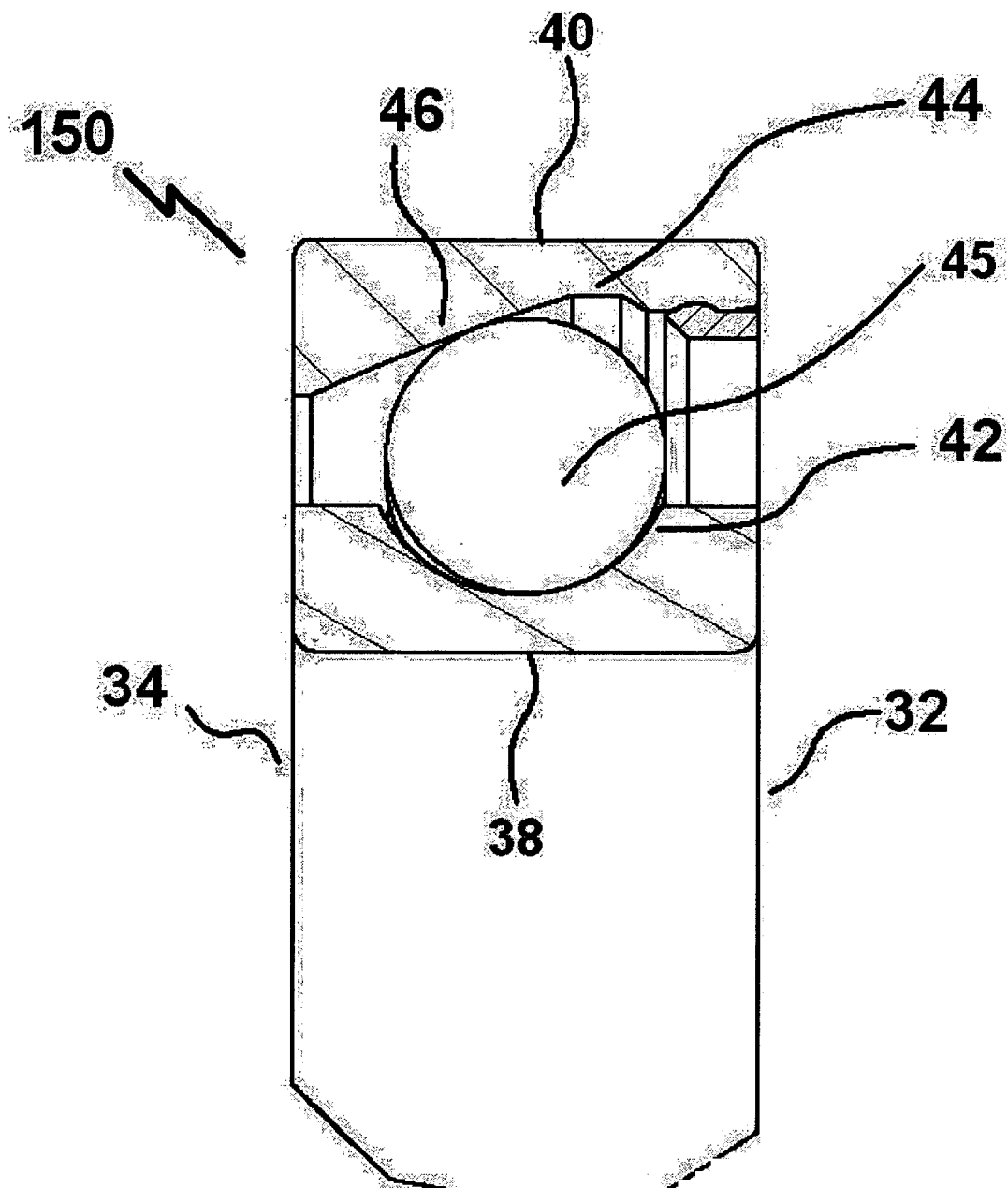
FIG. 5 is a detailed side elevation view of the radiused contact surface of the second individual bearing illustrated in FIG. 4.

Referring to FIG. 4, there is illustrated a second individual bearing, generally identified by reference numeral 150. Second individual bearing 150 is of similar construction to first individual bearing 100, and identical reference numerals have been used to identify identical features. There is a fundamental difference, however, the importance of which will be appreciated, when first individual bearing 100 and second individual bearing 150 are incorporated into a bearing stack, as will hereinafter be described. Centre point 50 has been shifted, as will be apparent from a comparison of FIG. 4 with FIG. 1. This is done so that first individual bearing 100 and second individual bearing 150 will share a common centre point 50 when placed in a bearing stack, as can be seen by looking ahead to FIG. 6. Referring to FIG. 5, this difference results in a change in radiused ball bearing contract surface 46, as will be apparent from a comparison of FIG. 5 with FIG. 2.

Figure 6:
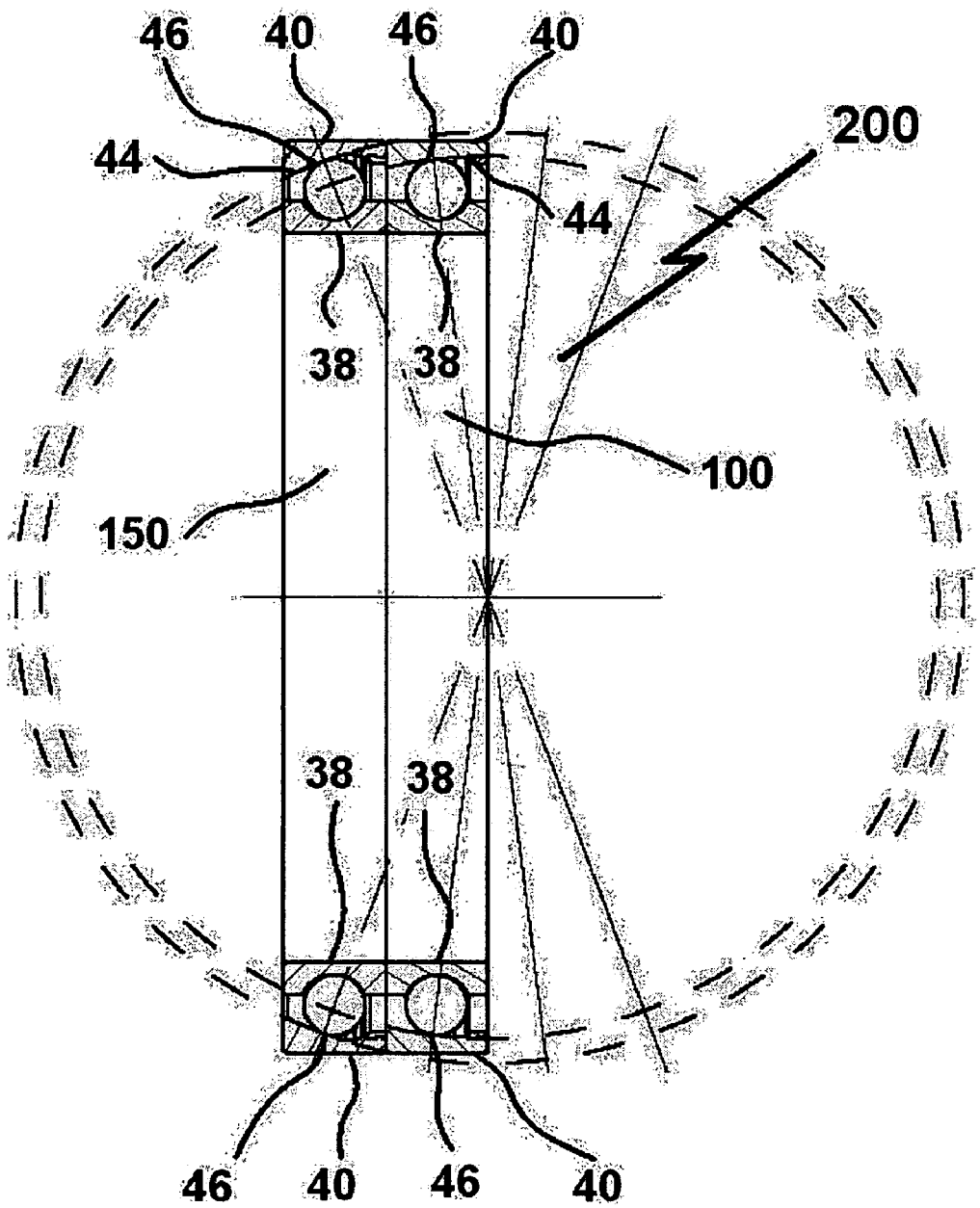
FIG. 6 is a side elevation view, in section, of an asymmetrical bearing stack consisting of the first individual bearing illustrated in FIG. 1 and the second individual bearing illustrated in FIG. 4.
Figure 7:
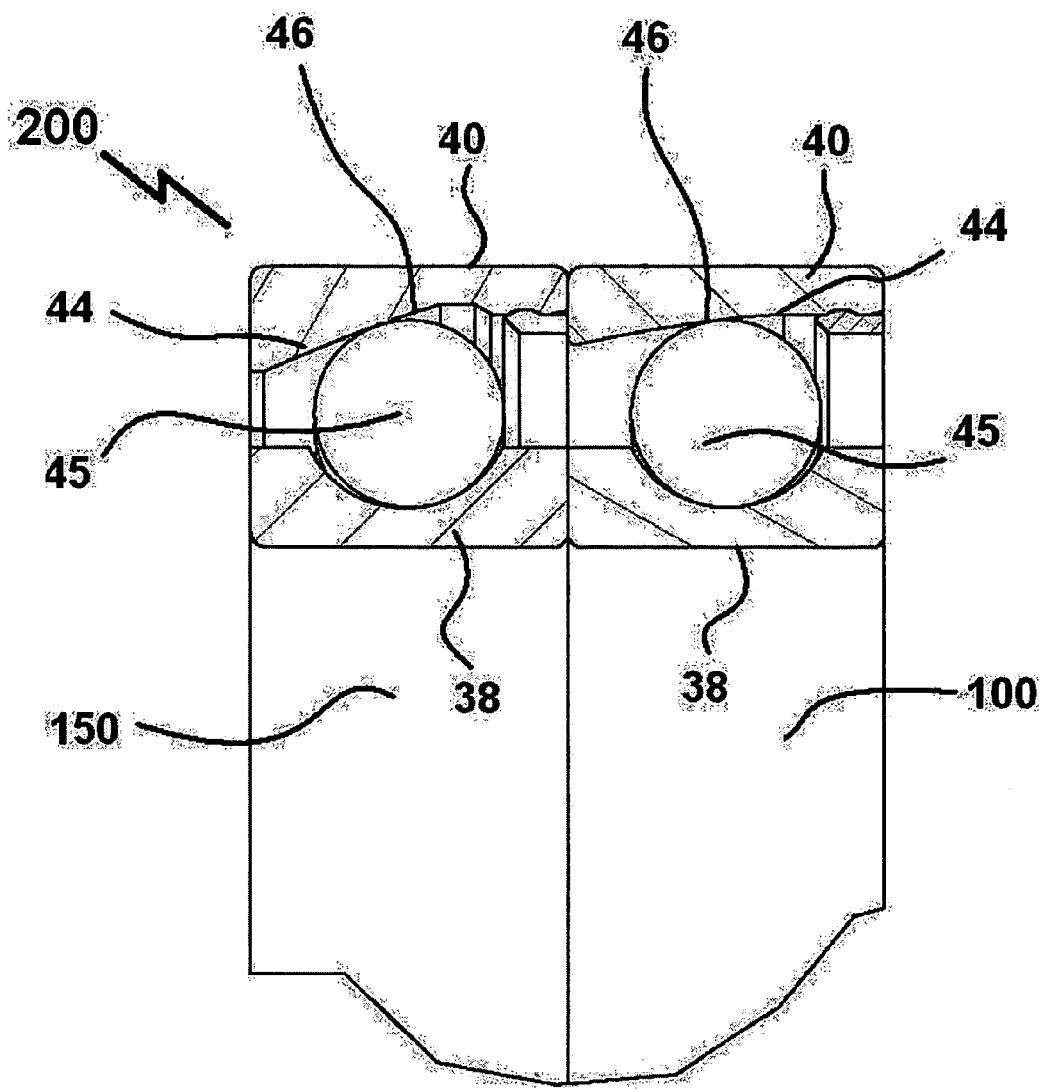
FIG. 7 is a detailed side elevation view of the radiused contact surfaces of the first individual bearing and the second individual bearing in the asymmetrical bearing stack illustrated in FIG. 6.

Referring to FIG. 6, there is illustrated an asymmetrical bearing stack 200 consisting of first individual bearing 100 illustrated in FIG. 1 and second individual bearing 150 illustrated in FIG. 4. arranged in face to face relation. First individual bearing 100 and second individual bearing 150 share a common rotational axis 36. They also share a common centre point 50 positioned on common rotational axis 36, about which ball bearing contact surface 46 for each of first individual bearing 100 and second individual bearing 150 is radiused. Referring to FIG. 7, the difference in ball bearing contact surfaces 46 can be noted. As will hereinafter described with respect to FIG. 18 through 21, the use of the common centre point 50 permits bearing stack 200 to better accommodate misalignment. This is due, at least in part, to the fact that outer races 44 of each of first individual bearing 100 and second individual bearing 150 are capable of limited swivelling movement about common centre point 50. Bearing stack 200 is referred to as "asymmetrical" due to the asymmetrical positioning of common centre point 50. This can be compared to a two bearing stack which is symmetrical, as illustrated in FIG. 12.

Figure 8:
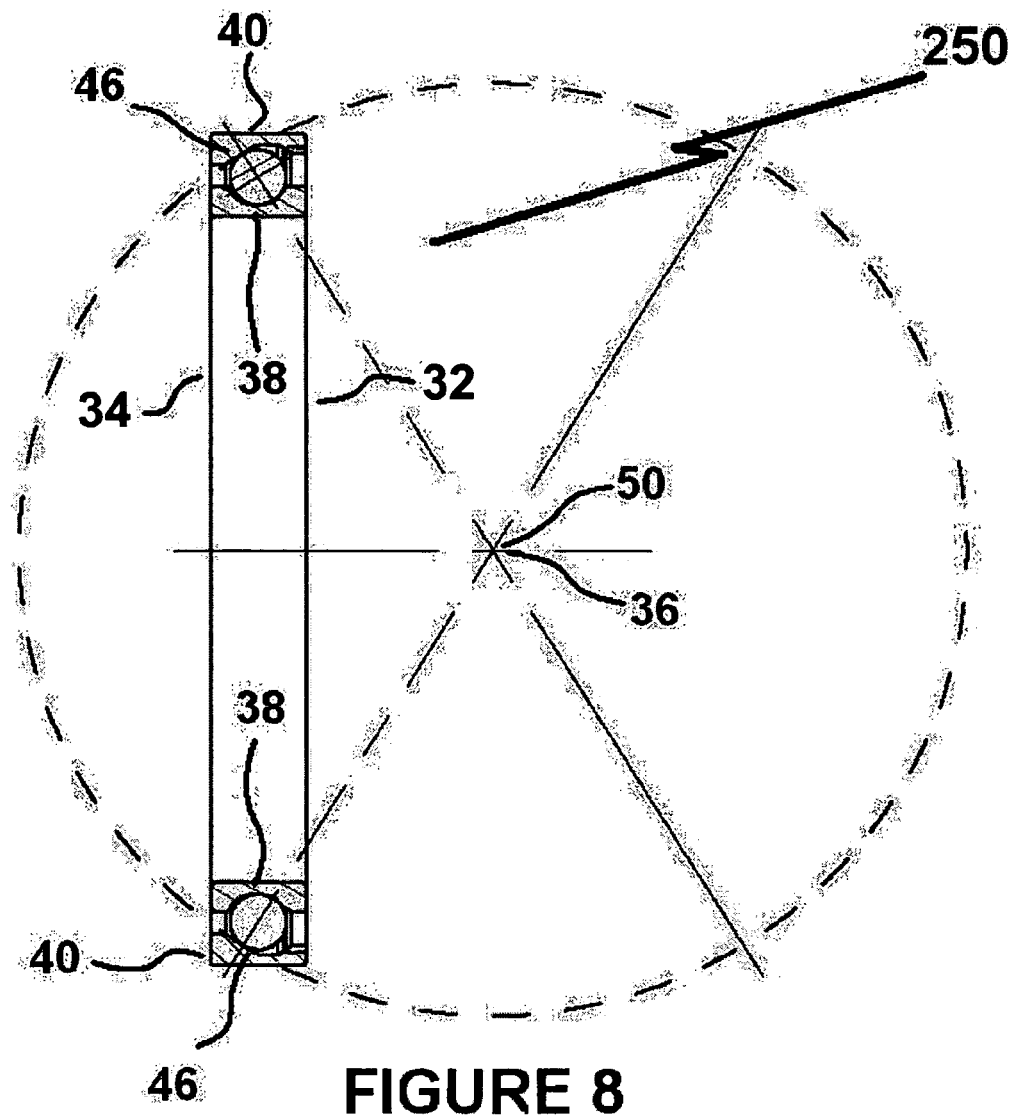
FIG. 8 is a side elevation view, in section, of a third individual bearing constructed in accordance with the teachings of the present invention, with rotational axis and radial centre point marked.
Figure 9:
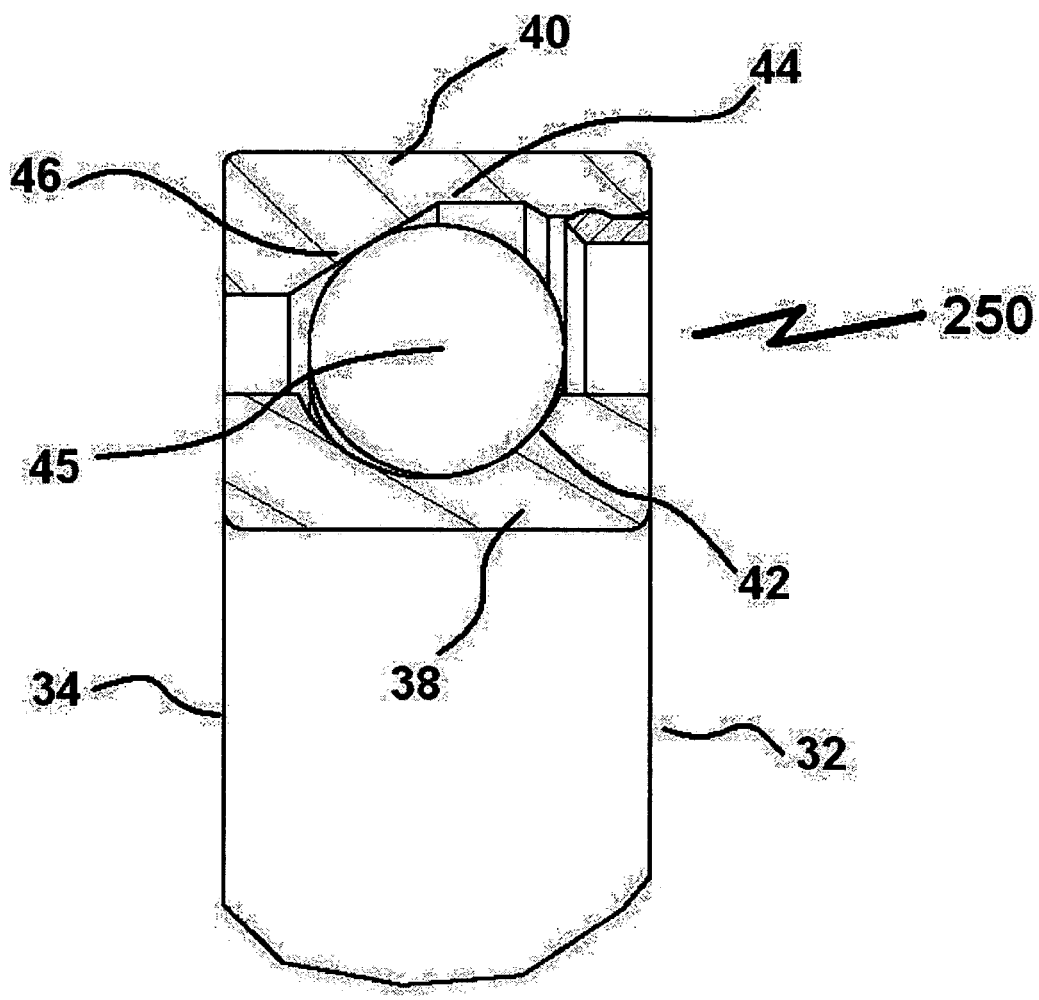
FIG. 9 is a detailed side elevation view of the radiused contact surface of the third individual bearing illustrated in FIG. 8.

Referring to FIG. 8, there is illustrated a third individual bearing, generally identified by reference numeral 250. Third individual bearing 250 is of similar construction to first individual bearing 100 and second individual bearing 150, and identical reference numerals have been used to identify identical features. There is a fundamental difference, however, the importance of which will be appreciated, when first individual bearing 100, second individual bearing 150 and third individual bearing 250 are incorporated into a bearing stack, as will hereinafter be described. Centre point 50 has been shifted, as will be apparent from a comparison of FIG. 8 with FIG. 4 and FIG. 1 This is done so that first individual bearing 100, second individual bearing 150 and third individual bearing 250 will share a common centre point 50 when placed in a bearing stack, as can be seen by looking ahead to FIG. 10. Referring to FIG. 9, this difference results in a change in radiused ball bearing contract surface 46, as will be apparent from a comparison of FIG. 9 with FIGS. 2 and 5.

Figure 10:
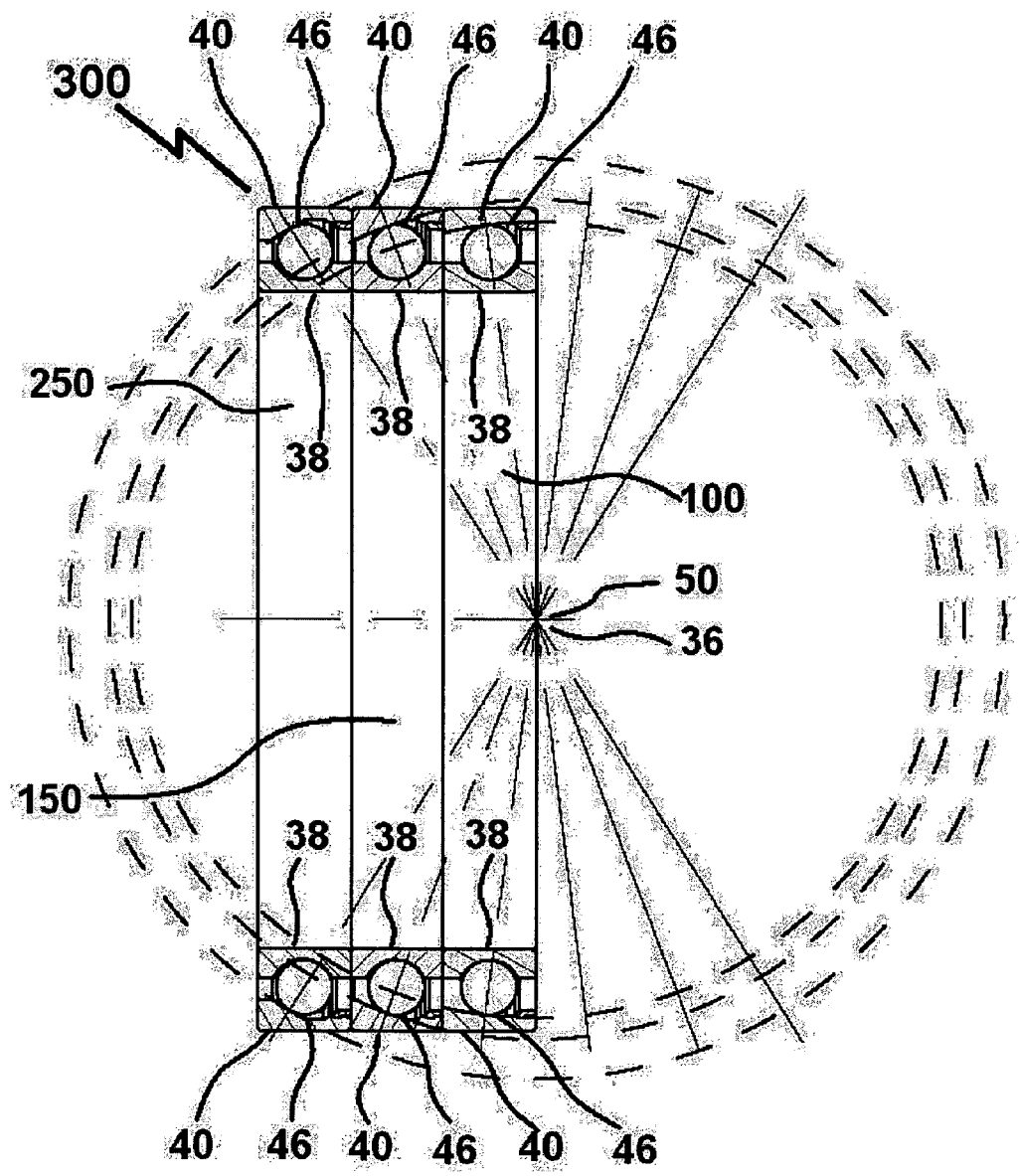
FIG. 10 is a side elevation view, in section, of an asymmetrical bearing stack consisting of the first individual bearing illustrated in FIG. 1, the second individual bearing illustrated in FIG. 4, and the third individual bearing illustrated in FIG. 8.
Figure 11:
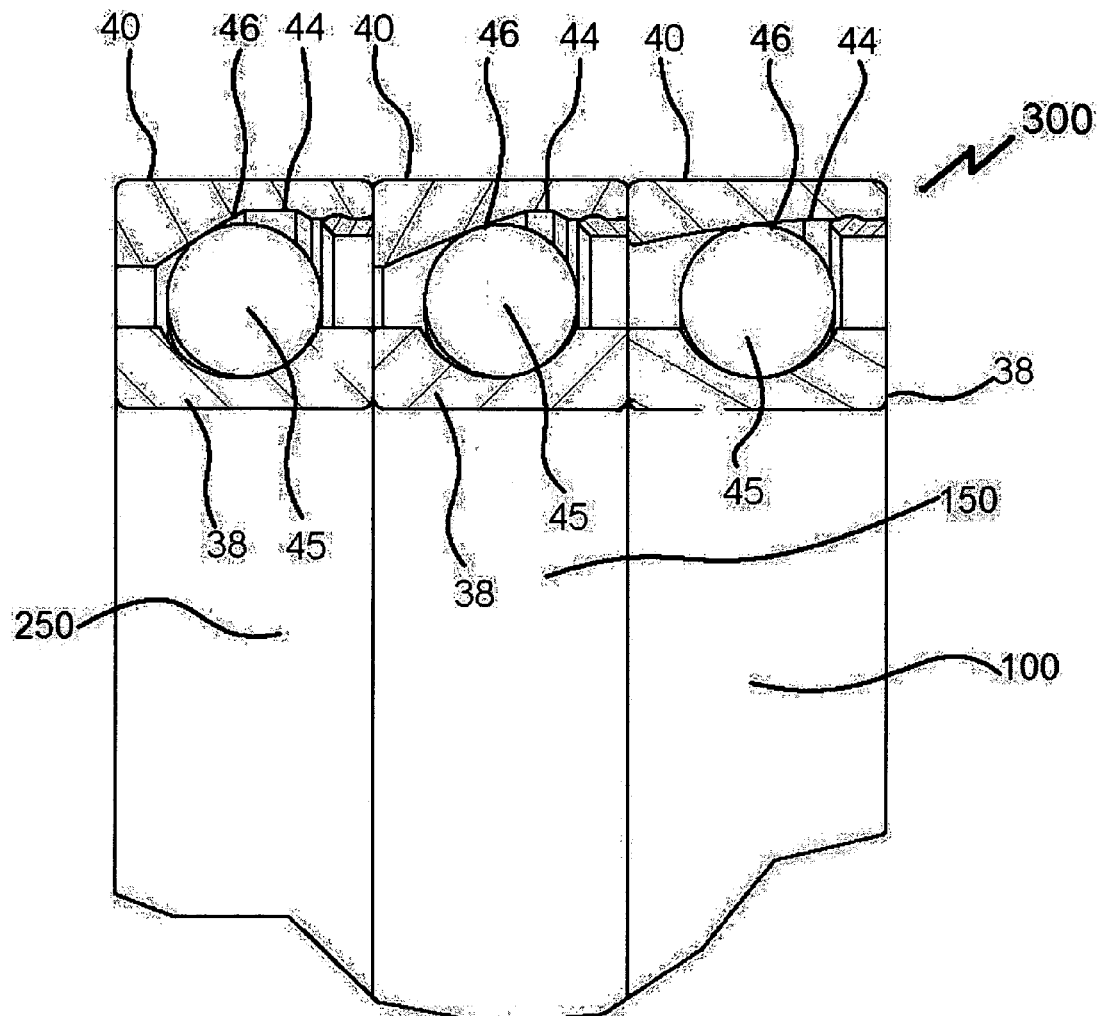
FIG. 11 is a detailed side elevation view of the radiused contact surfaces of the first individual bearing, the second individual bearing and the third individual bearing in the asymmetrical bearing stack illustrated in FIG. 10.

Referring to FIG. 10, there is illustrated an asymmetrical bearing stack 300 consisting of first individual bearing 100 illustrated in FIG. 1, second individual bearing 150 illustrated in FIG. 4., and third individual bearing 250 as illustrated in FIG. 8 arranged in face to face relation. First individual bearing 100, second individual bearing 150 and third individual bearing 250 share a common rotational axis 36. They also share a common centre point 50 positioned on common rotational axis 36, about which ball bearing contact surface 46 for each of first individual bearing 100, second individual bearing 150 and third individual bearing 250 is radiused. Referring to FIG. 11, the difference in ball bearing contact surfaces 46 can be noted. As will hereinafter described with respect to FIG. 18 through 21, the use of the common centre point 50 permits bearing stack 300 to better accommodate misalignment. This is due, at least in part, to the fact that outer races 44 of each of first individual bearing 100, second individual bearing 150 and third individual bearing 250 are capable of limited swivelling movement about common centre point 50.

Figure 12:
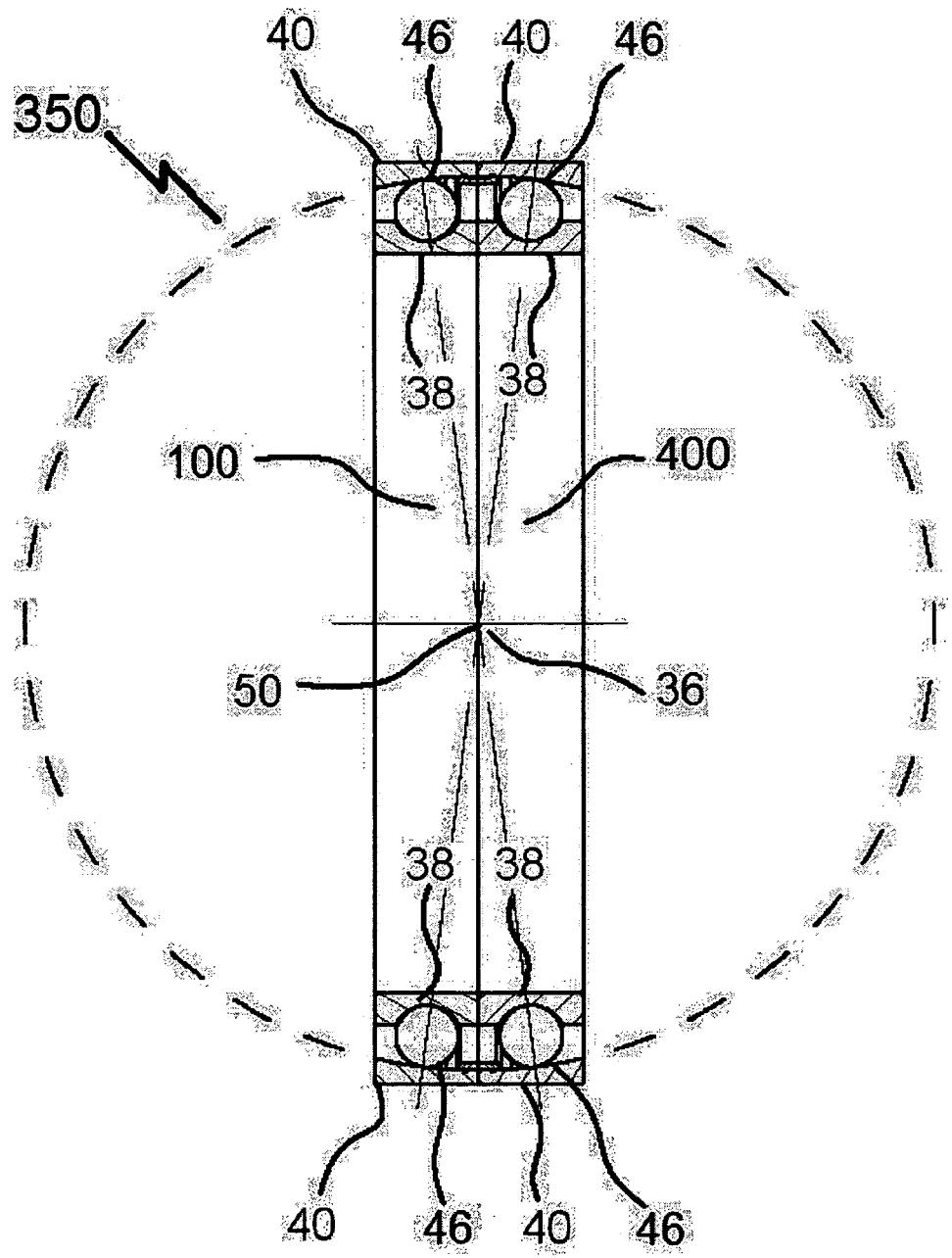
FIG. 12 is a side elevation view, in section, of a bearing stack consisting of the first individual bearing illustrated in FIG. 1, and a first mirror image bearing placed in a symmetrical configuration.
Figure 13:
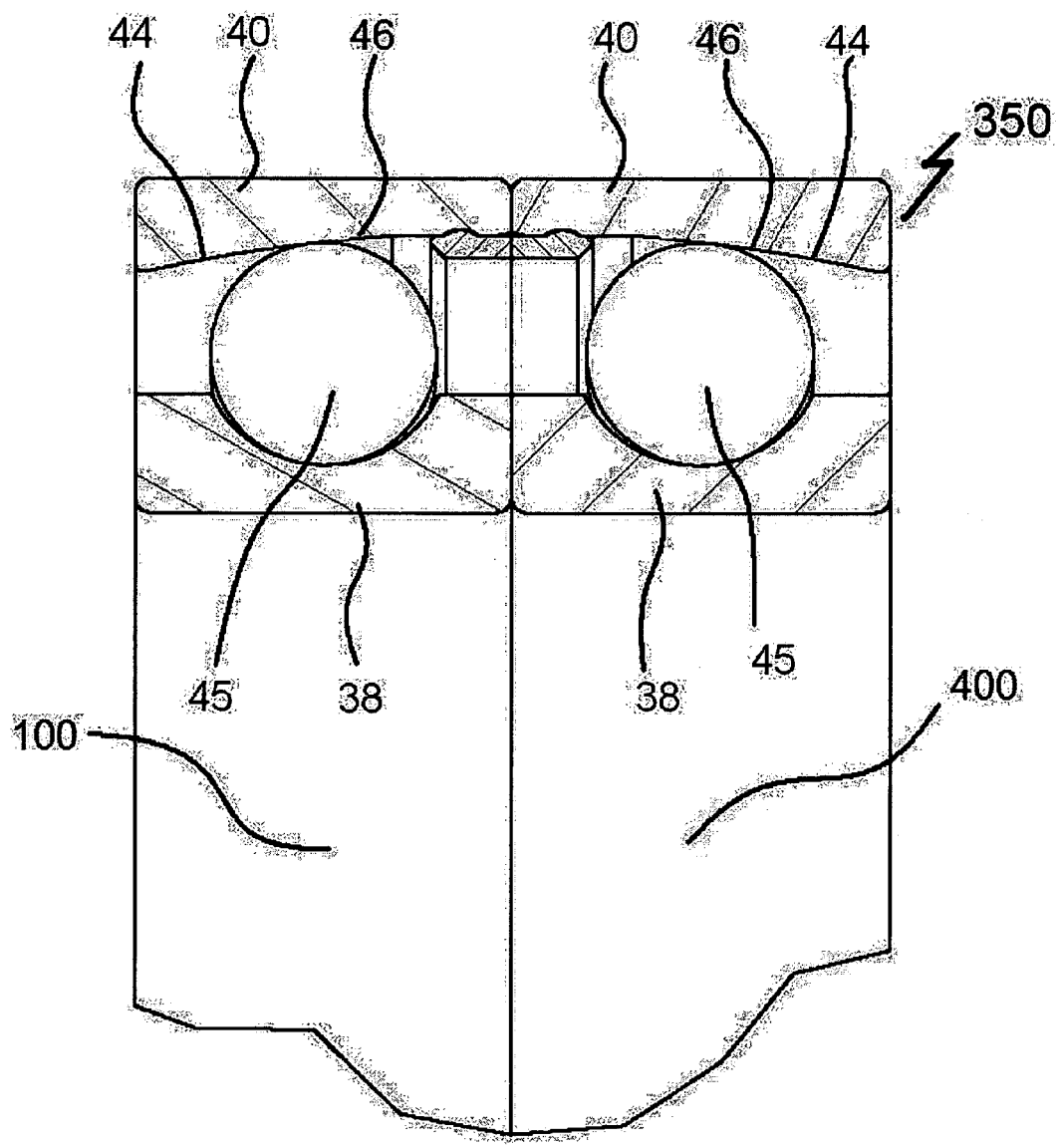
FIG. 13 is a detailed side elevation view of the radiused contact surfaces of the first individual bearing, the first mirror image bearing in the symmetrical bearing stack illustrated in FIG. 12.
Figure 14:
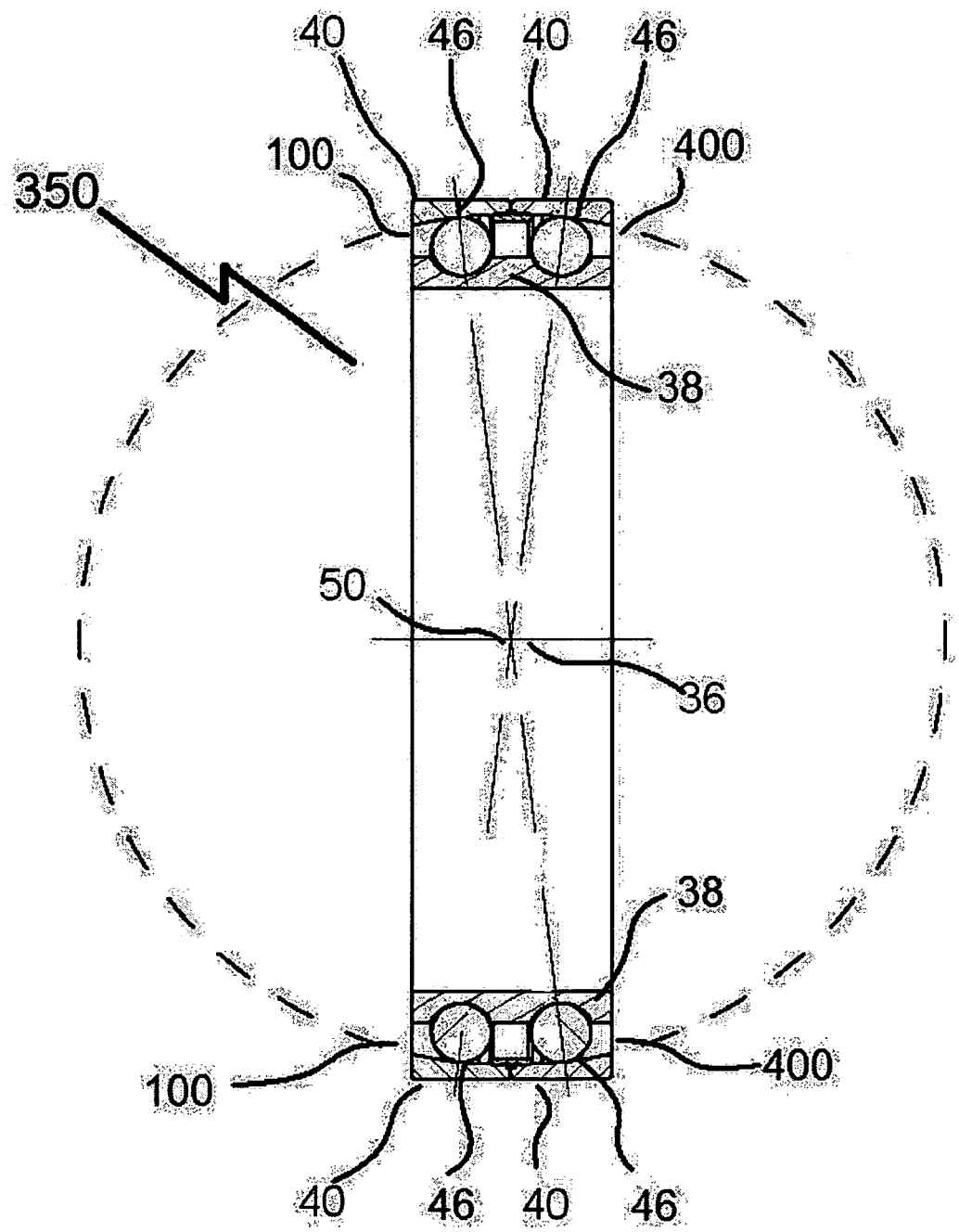
FIG. 14 is a side elevation view, in section, of a bearing stack consisting of the first individual bearing illustrated in FIG. 1, and a first mirror image bearing placed in a symmetrical configuration with a shared inner ring.
Figure 15:
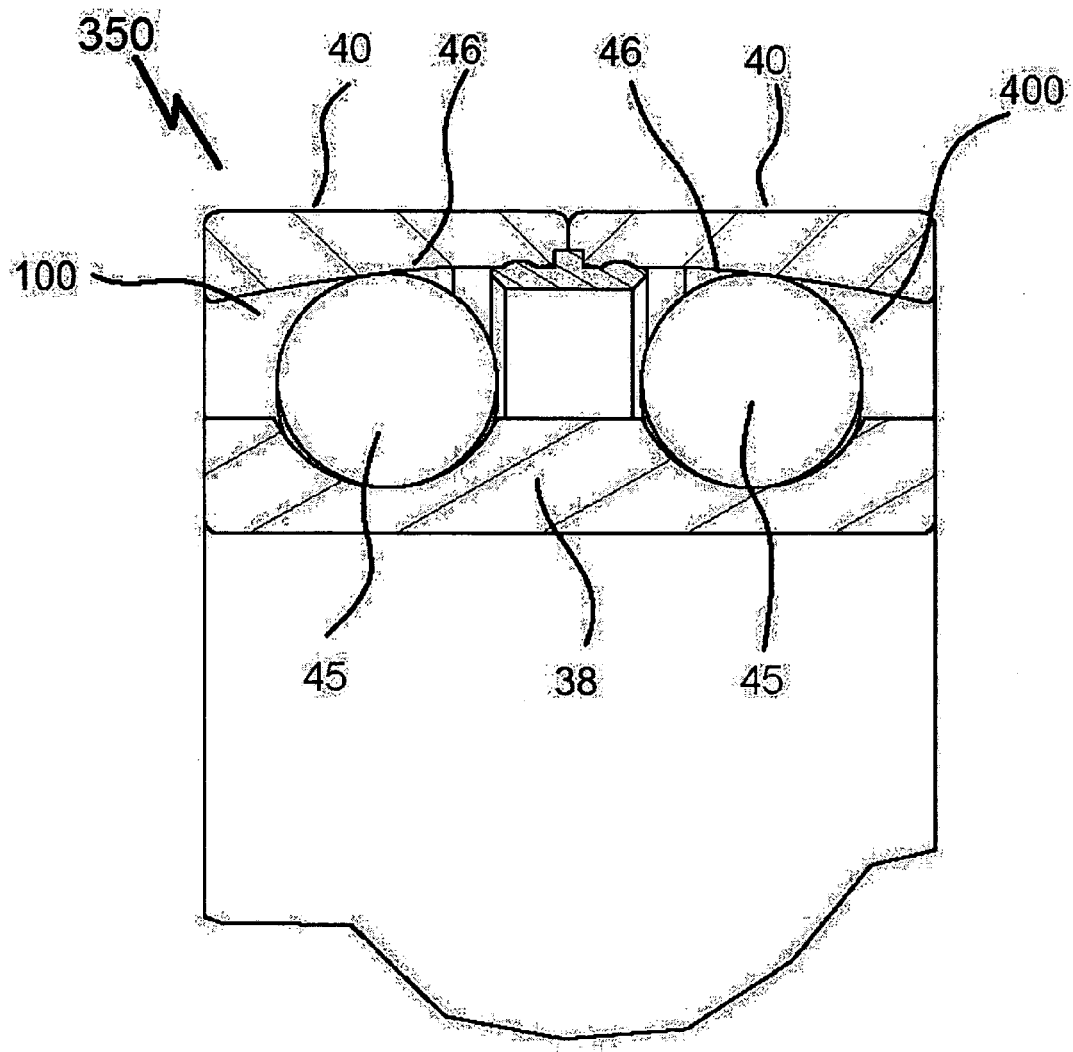
FIG. 15 is a detailed side elevation view of the radiused contact surfaces of the first individual bearing, the first mirror image bearing in the symmetrical bearing stack with the shared inner ring illustrated in FIG. 14.

Referring to FIG. 12, there is illustrated a symmetrical bearing stack 350 consisting of first individual bearing 100 illustrated in FIG. 1, and a first mirror image bearing 400 placed in a symmetrical configuration. The difference between a symmetrical configuration and an asymmetrical configuration relates to the positioning of centre point 50 in a central position between first individual bearing 100 and first mirror image bearing 400, as is apparent from a comparison of FIG. 12 with FIG. 6. This has a corresponding effect upon ball bearing contact surfaces, as is apparent from a comparison of FIG. 13 with FIG. 7. Referring to FIGS. 14 and 15, demonstrates that bearing stack 350 can be fabricated with a common inner sleeve 38 that serves as inner ring for more than one bearing.

Figure 16:
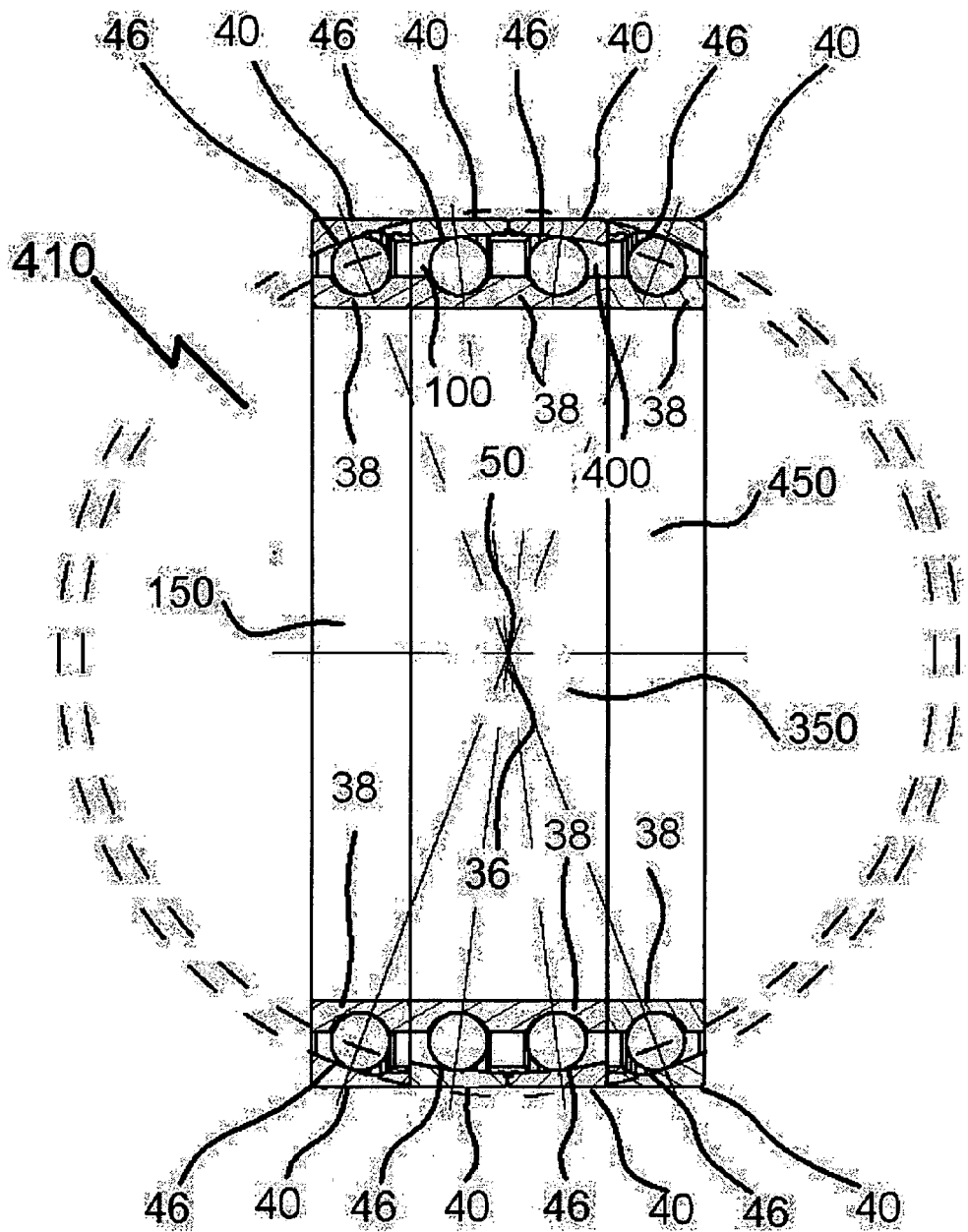
FIG. 16 is a side elevation view, in section, of a symmetrical bearing stack consisting of the bearing with the shared inner ring illustrated in FIG. 14, the second individual bearing illustrated in FIG. 4 and a second mirror image bearing.
Figure 17:
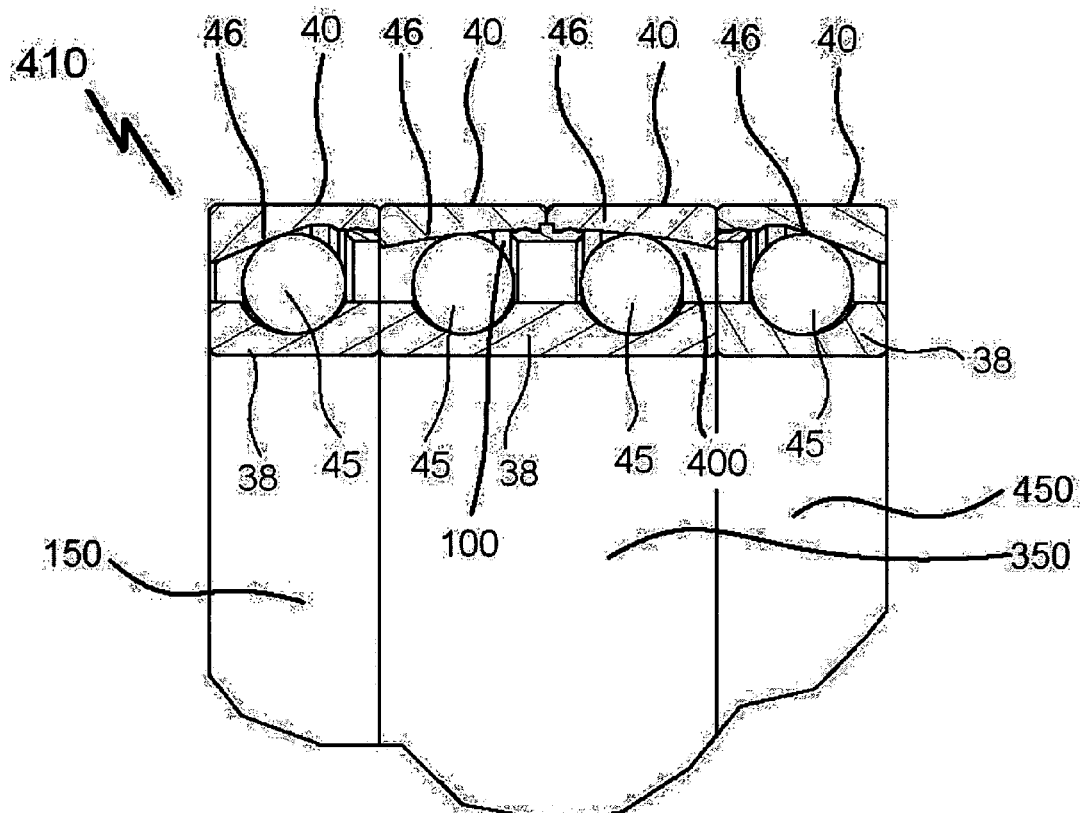
FIG. 17 is a detailed side elevation view of the radiused contact surfaces of the symmetrical bearing stack illustrated in FIG. 16.

Referring to FIG. 16, there is illustrated a symmetrical bearing stack 410 consisting of bearing stack 350 illustrated in FIG. 14, combined with second individual bearing 150 illustrated in FIG. 4 and a second mirror image bearing 450. FIG. 17 show radiused ball bearing contact surfaces 46 of symmetrical bearing stack 410. The purpose of this illustration is to demonstrate that bearing stacks with common inner sleeves will work cooperatively with individual bearings.

Figure 18:
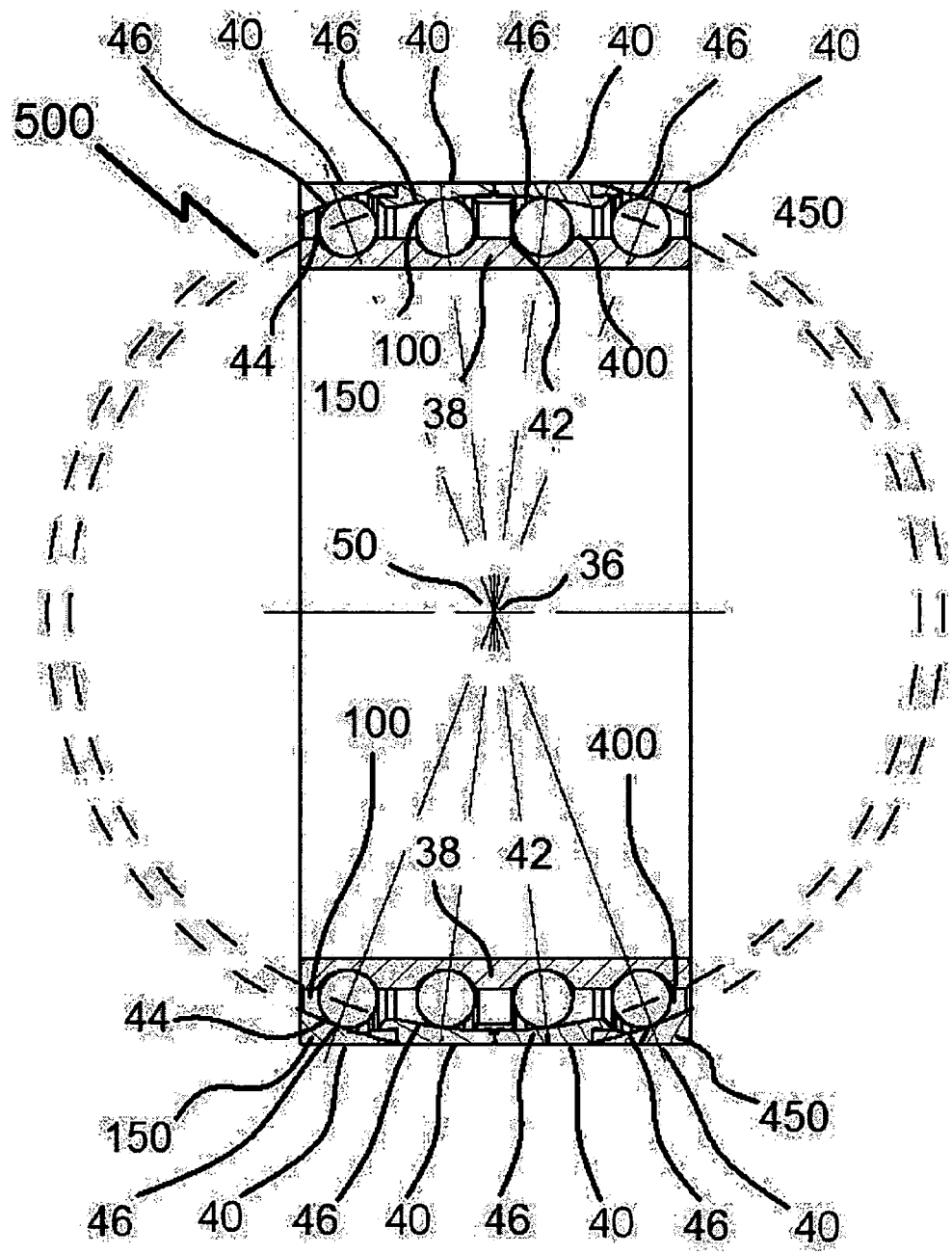
FIG. 18 is a side elevation view, in section, of the symmetrical bearing stack illustrated in FIG. 16 fabricated with a shared inner ring, prior to shaft misalignment.

Referring to FIG. 18, this Figure illustrates a symmetrical bearing stack 500 containing the same bearing configuration as symmetrical bearing stack 410 only with a common inner ring or sleeve 38. As will hereinafter be further described in relation to operation, FIGS. 18 and 19 illustrate radiused contact surfaces 46 of symmetrical bearing stack 500 prior to shaft misalignment, whereas FIG. 20 and FIG. 21 demonstrate how symmetrical bearing stack 500 reacts to shaft misalignment.

Figure 22:
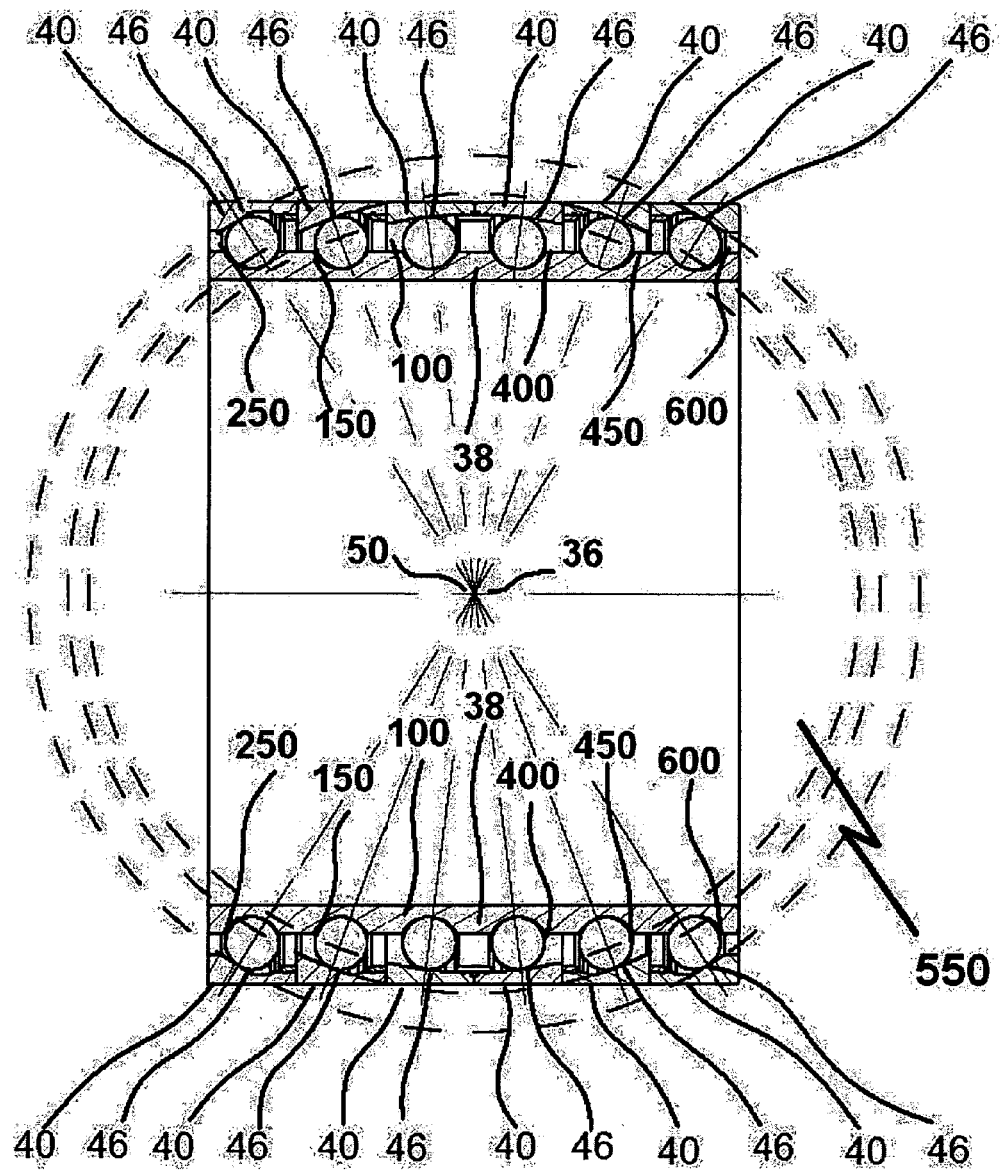
FIG. 22 is a side elevation view, in section, of a symmetrical six bearing stack with shared inner ring.
Figure 23:
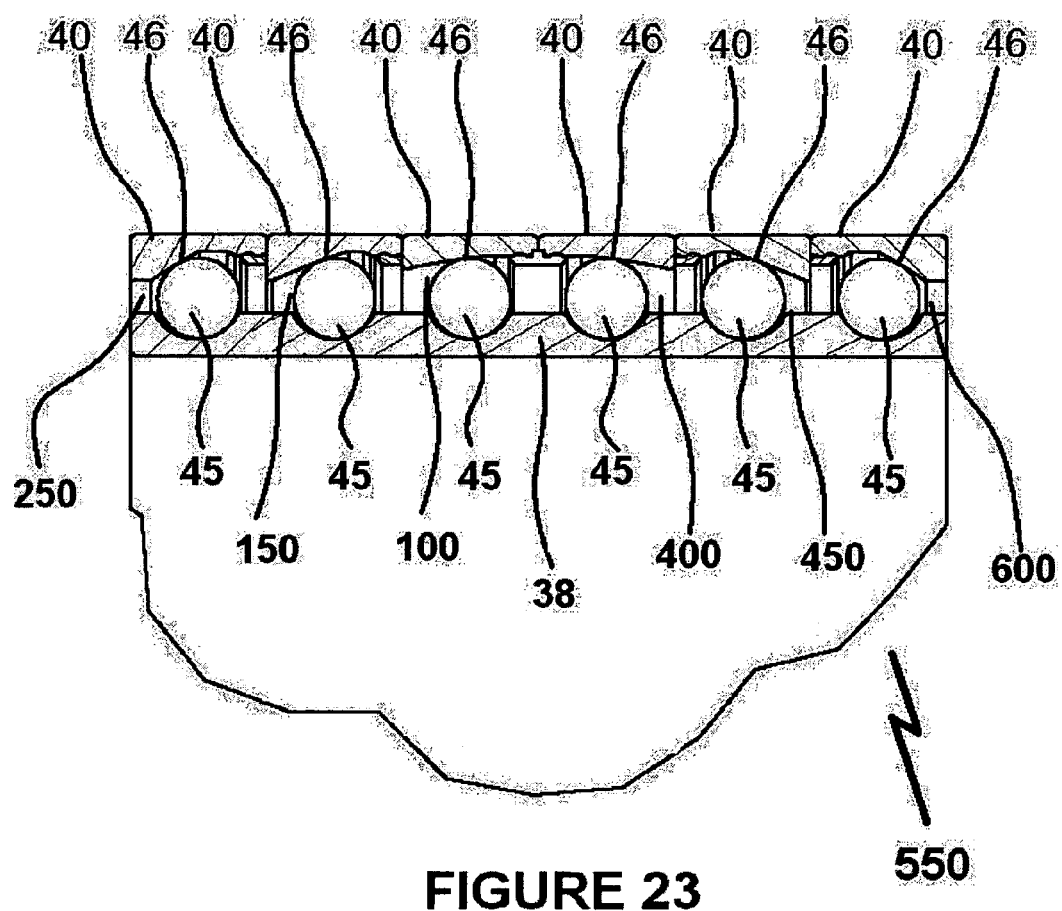
FIG. 23 is a detailed side elevation view of the radiused contact surfaces of the symmetrical bearing stack with shared inner ring illustrated in FIG. 22.

Referring to FIG. 22, this figure illustrates that the same principles can be applied in constructing larger bearing configurations. In this case, a symmetrical six bearing stack 550 with shared inner ring or sleeve 38. There has been added the equivalent of third individual bearing 250 and a third mirror image bearing 600. Referring to FIG. 23 radiused contact surfaces 46 of symmetrical bearing stack 550 are shown.

Figure 19:
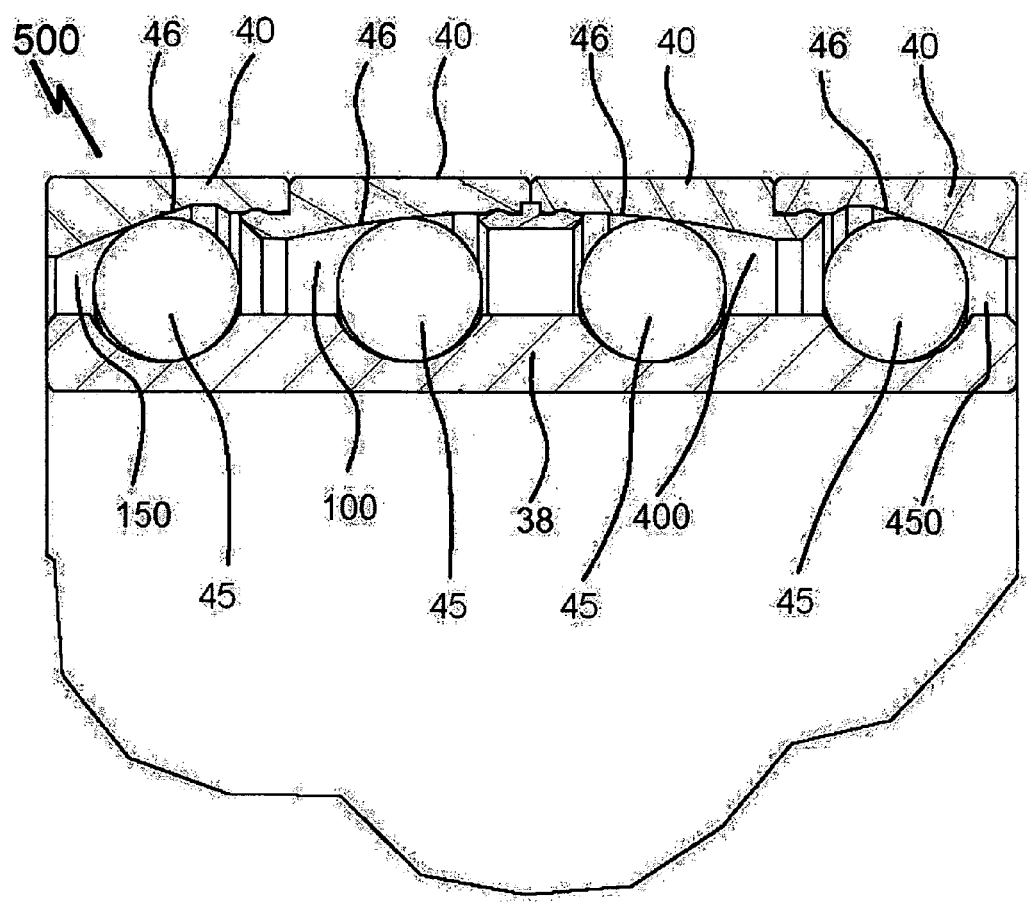
FIG. 19 is a detailed side elevation view of the radiused contact surfaces of the symmetrical bearing stack with shared inner ring illustrated in FIG. 18, prior to shaft misalignment.
Figure 20:
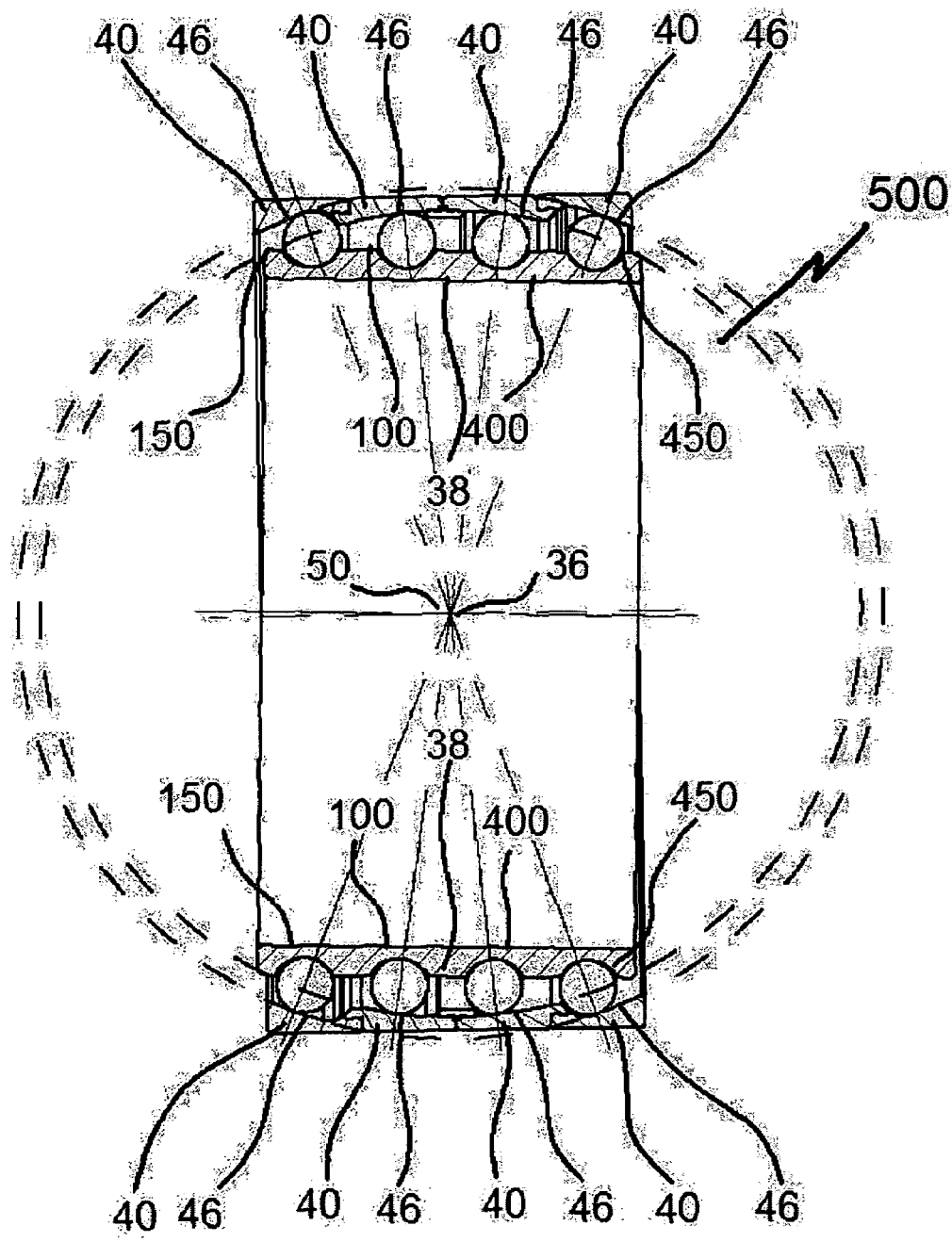
FIG. 20 is a side elevation view, in section, of the symmetrical bearing stack with shared inner ring illustrated in FIG. 18, reacting to shaft misalignment.
Figure 21:
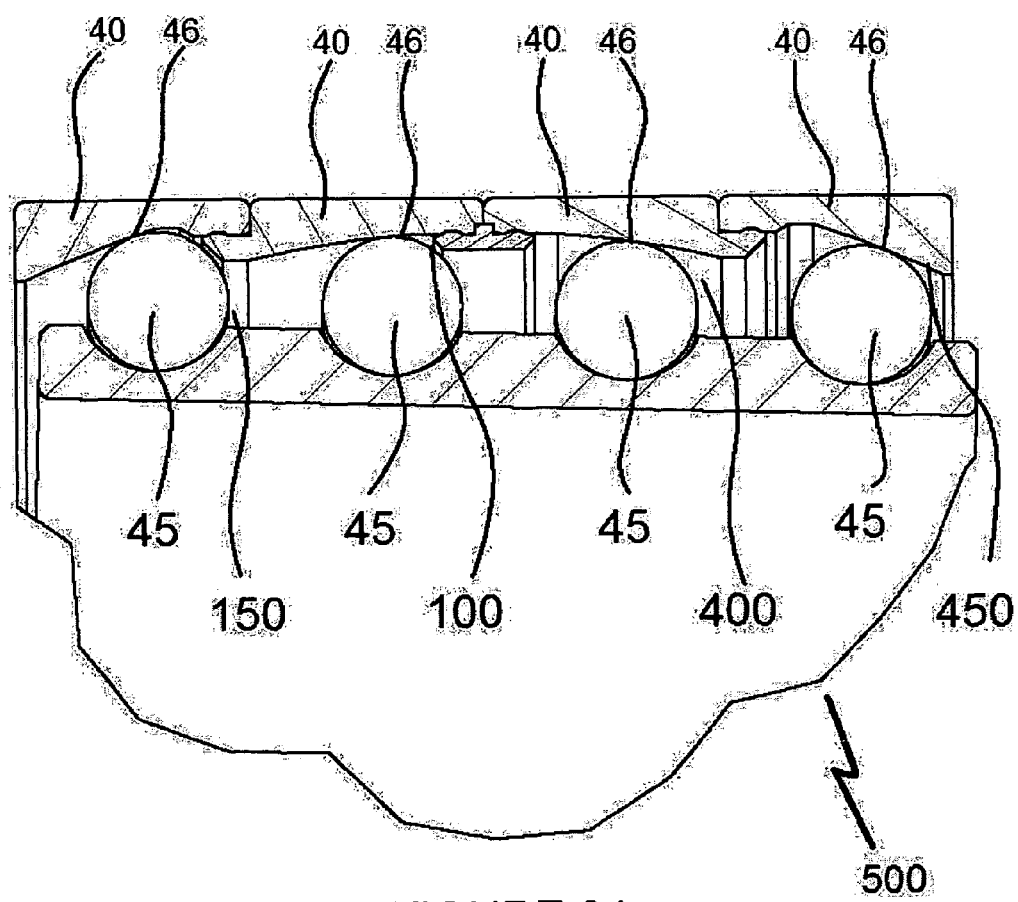
FIG. 21 is a detailed side elevation view of the radiused contact surfaces of the symmetrical bearing stack with shared inner ring illustrated in FIG. 20, reacting to shaft misalignment.

Operation:

Referring to FIGS. 18 and 19, although the individual bearings of symmetrical bearing stack 500 are connected by common inner ring or sleeve 38, it is useful for the purpose of this description of operation of identify the bearings individually. First individual bearing 100 and first mirror image bearing 400 are positioned nearest common centre point 50 and, as such, they accommodates primarily radial loads. Second individual bearing 150 and second mirror image bearing 450 are farther away from common centre point 50. The radius from common centre point 50 which serves to defined radiused ball bearing contact surface 46 of these bearings are angled, which gives them a capacity to handle loads that have an axial as well as a radial component. Referring to FIGS. 22 and 23, it will become apparent that bearings are capable of accommodating an increasing axial thrust load component the farther they are spaced from common centre point 50. In bearing stack 550, third individual bearing 250 and a third mirror image bearing 600 will bear more axial thrust load than will second individual bearing 150 or second mirror image bearing 450. With asymmetrical bearings stacks such as bearing stack 300 illustrated in FIGS. 10 and 11, there is only the ability to handle axial thrust loads in one direction. Whereas with symmetrical bearing stacks, such as bearing stack 500 illustrated in FIG. 18 through 21, there is the ability to handle axial thrust loads in either direction. Although inner ring or sleeve 38 can be made so it is common to some or all bearings in the bearing stack, a major advantage in accommodating misalignment is obtained by having outer rings 40 independently movable. This could mean that all of outer rings 40 are independently movable, or certain strategically positioned ones of outer rings 40, so as to achieve the same objective. When misalignment occurs, as illustrated in FIGS. 20 and 21, outer rings 40 swivel to accommodate, at least in part, the misalignment. The extent of movement can be discerned by a comparison of FIG. 19, showing positioning before misalignment with FIG. 21 showing positioning after misalignment.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A ball bearing stack, comprising:
   more than one bearing arranged in face to face relation and sharing a common rotational axis, each bearing having an inner ring and a concentric outer ring, the inner ring defining an inner race, the outer ring defining an outer race, with a plurality of ball bearings captured within an annular space defined between the inner race and the outer race; and
   each of the more than one bearing having a ball bearing contact surface on the outer race which is radiused from face to face about a common centre point positioned on the common rotational axis.

2. The ball bearing stack as defined in claim 1, wherein the outer races of each of the more than one bearing being capable of limited swivelling movement about the common centre point to accommodate limited misalignment.

3. The ball bearing stack as defined in claim 1, wherein a common inner sleeve is provided which serves as the inner ring for each of the bearings.

4. The ball bearing stack as defined in claim 1, wherein the more than one bearing includes at least one bearing positioned near the common centre point which accommodates primarily radial loads, with bearings accommodating an increasing axial load component the farther they are spaced from the common centre point.

5. The ball bearing stack as defined in claim 1, wherein the more than one bearing are symmetrically arranged with an equal number of bearings on either side of the common centre point.

\* \* \* \* \*